Feb. 3, 1925.
I. L. LIEBER
1,525,403
CUFF LINK
Filed Feb. 7, 1922
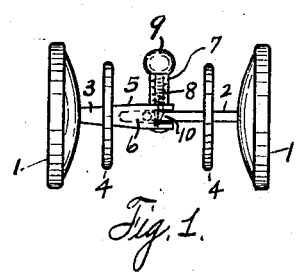
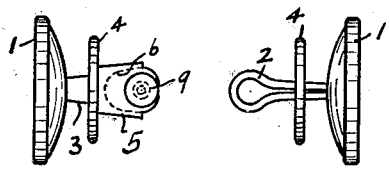
INVENTOR.
Irving L. Lieber.
BY
ATTORNEY.S Patented Feb. 3, 1925.

1,525,403

UNITED STATES PATENT OFFICE.

IRVIN L. LIEBER, OF HOUSTON, TEXAS.

CUFF LINK.

Application filed February 7, 1922. Serial No. 534,805.

*To all whom it may concern:*

Be it known that I, IRVIN L. LIEBER, citizen of the Republic of Poland, residing at Houston, in the county of Harris and State of Texas, have invented certain new and useful Improvements in Cuff Links, of which the following is a specification.

This invention relates to new and useful improvements in cuff links.

One object of the invention is to provide cuff links which are detachable so that they may be readily released to come apart when it is desired to open the cuff of a garment.

Another object of the invention resides in the construction whereby the links are securely held to the garment's sleeve so as to prevent loss.

A further feature of the invention resides in the provision of detachable cuff links which may be easily engaged, or secured together to hold the cuff or wrist band of the garments in place.

With the above and other objects in view the invention has particular relation to certain novel features of construction, arrangement of parts and use, an example of which is given in this specification and illustrated in the accompanying drawings, wherein:—

Figure 1 shows a plan view of the device.

Figures 2 and 3 show the respective links thereof separated.

Referring now more particularly to the drawings, the numerals 1, 1 designate the buttons one of which is formed with a long link like loop 2 and the other one of which is formed with a shank 3. There are discs 4, 4 secured on the loop 2 and the shank 3 spaced from the respective buttons, and the material of the garment is held between said discs and buttons to prevent the loss of the links. The shank 3 is extended inwardly beyond the disc 4 and formed with a socket bearing 5 which is provided with a deep recess 6 of a form to receive the loop 2. One side of this bearing has a long collar 7 permanently secured thereto and within it there is a spring latch 8. The outer end of this latch is formed with an enlarged knob and the inner end of its has an outward beveled face 10. When it is desired to secure the links together the loop 2 is inserted into the recess 6 and pressing against the beveled face 10 forces the latch out of its way and when the loop has passed said latch its spring will cause it to engage in the loop and hold the links together. When it is desired to release and separate said links the knob 9 may be grasped and pulled thus releasing the latch from the loop.

What I claim is:

1. A separable cuff link comprising a button which carries a connector, a second button, releasing means carried by said second button, said releasing means including a portion which when put under slight pressure by pressing contact therewith of a portion of said connector in the movement of said buttons toward each other coactively connects said buttons against separation, there being an opening in said connector through which a portion of said releasing means passes to effect the connection of said buttons against separation while allowing said buttons to have relative universal movement, and said releasing means being operable to allow the separation of said buttons.

2. A separable cuff link comprising a button having a shank with an eye at the end thereof, a second button, a spring actuated latch carried by said second button for reciprocation, a portion of said latch when put under pressure by pressing contact therewith of a portion of said eye in the movement of said buttons toward each other causing said latch to move in one direction against the action of its spring until it clears the portion of said eye whereupon a portion of said latch will pass through said eye to connect said buttons against separation, said latch being retractable to allow the separation of said buttons.

In testimony whereof I have signed my name to this specification in the presence of two subscribing witnesses.

IRVIN L. LIEBER.

Witnesses:
JAS. W. OLIVER,
E. V. HARDWAY.